(12) United States Patent  
Pratt et al.

(10) Patent No.: US 8,818,872 B2  
(45) Date of Patent: Aug. 26, 2014

(54) POINT OF SALE TRANSACTION PROCESSING

(75) Inventors: James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 930 days.

(21) Appl. No.: 11/936,507

(22) Filed: Nov. 7, 2007

(65) Prior Publication Data

US 2009/0119181 A1  May 7, 2009

(51) Int. Cl.
| | |
|---|---|
| *G06Q 20/00* | (2012.01) |
| *G06Q 40/00* | (2012.01) |
| *G06Q 20/20* | (2012.01) |
| *G06Q 20/40* | (2012.01) |
| *G06Q 20/10* | (2012.01) |
| *G06Q 20/04* | (2012.01) |
| *G06Q 40/02* | (2012.01) |

(52) U.S. Cl.
CPC .............. *G06Q 20/204* (2013.01); *G06Q 20/20* (2013.01); *G06Q 20/202* (2013.01); *G06Q 20/40* (2013.01); *G06Q 20/10* (2013.01); *G06Q 40/00* (2013.01); *G06Q 20/102* (2013.01); *G06Q 20/04* (2013.01); *G06Q 40/02* (2013.01)
USPC ............................................. 705/17; 705/39

(58) Field of Classification Search
CPC ... G06Q 20/204; G06Q 20/20; G06Q 20/202; G06Q 20/40; G06Q 20/10; G06Q 40/00; G06Q 20/102; G06Q 20/04; G06Q 40/02
USPC ...................................................... 705/17, 39
See application file for complete search history.

(56) References Cited

U.S. PATENT DOCUMENTS

| | | | | | |
|---|---|---|---|---|---|
| 4,965,821 | A | * | 10/1990 | Bishop et al. | 455/409 |
| 5,420,926 | A | * | 5/1995 | Low et al. | 705/74 |
| 5,445,295 | A | * | 8/1995 | Brown | 221/3 |
| 5,485,505 | A | * | 1/1996 | Norman et al. | 455/419 |
| 5,608,778 | A | * | 3/1997 | Partridge, III | 455/411 |
| 5,724,424 | A | * | 3/1998 | Gifford | 705/79 |
| 5,740,247 | A | * | 4/1998 | Violante et al. | 380/247 |
| 5,812,945 | A | * | 9/1998 | Hansen et al. | 455/403 |

(Continued)

OTHER PUBLICATIONS

Marketplace; Anonymous; Security nanagement 48.11 (Nov. 2004) pp. 112,119-120,122-124,126-128, 130-132.*

(Continued)

*Primary Examiner* — Matthew Gart  
*Assistant Examiner* — Harshad Parikh  
(74) *Attorney, Agent, or Firm* — Jackson Walker L.L.P.

(57) ABSTRACT

A disclosed transaction processing method includes transmitting a request to a credit aggregator in response to a message from a point of sale device to a wireless communication device of a user. Responsive to receiving credit account information from the credit aggregator, a user interface indicative of at least some of the credit account information including account identification information for a plurality of user credit accounts is displayed. Responsive to detecting a user selecting one of the plurality of credit accounts, credit account information is transmitted to the point of sale device. The request may include information identifying the user. The message from the point of sale device may indicate a price associated with the transaction. The credit account information may include available credit information, current balance information, closing date information, payment date information, annual percentage rate information, and so forth.

20 Claims, 6 Drawing Sheets

| NICKNAME | BALANCE | AVAILABLE | CLOSING DATE | PAYMENT DATE | APR | REWARD | |
|---|---|---|---|---|---|---|---|
| CREDIT SOURCE 1 | | | | | | | ←——702-1 |
| | | | | | | | |
| | | | | | | | |
| CREDIT SOURCE N | | | | | | | ←——702-N |

(56) References Cited

U.S. PATENT DOCUMENTS

| | | | |
|---|---|---|---|
| 5,878,141 A * | 3/1999 | Daly et al. | 705/78 |
| 5,956,400 A * | 9/1999 | Chaum et al. | 713/167 |
| 6,108,531 A * | 8/2000 | Berg et al. | 455/408 |
| 6,163,771 A * | 12/2000 | Walker et al. | 705/18 |
| 6,236,851 B1 * | 5/2001 | Fougnies et al. | 455/408 |
| 6,405,173 B1 * | 6/2002 | Honarvar et al. | 705/7.36 |
| 6,473,740 B2 * | 10/2002 | Cockrill et al. | 705/26.81 |
| 6,711,554 B1 * | 3/2004 | Salzmann et al. | 705/64 |
| 7,100,821 B2 * | 9/2006 | Rasti | 235/380 |
| 7,255,264 B2 * | 8/2007 | De Leon | 235/375 |
| 7,280,818 B2 * | 10/2007 | Clayton | 455/407 |
| 7,318,224 B2 * | 1/2008 | Honarvar et al. | 717/170 |
| 7,379,910 B2 * | 5/2008 | Abrahm et al. | 705/37 |
| 7,529,563 B1 * | 5/2009 | Pitroda | 455/558 |
| 7,613,648 B2 * | 11/2009 | Fortes et al. | 705/37 |
| 7,810,713 B2 * | 10/2010 | Lal et al. | 235/377 |
| 7,860,766 B2 * | 12/2010 | Seto et al. | 705/35 |
| 8,082,269 B2 * | 12/2011 | Yotsukura | 707/778 |
| 8,364,578 B1 * | 1/2013 | Honarvar | 705/38 |
| 8,396,794 B1 * | 3/2013 | Mo et al. | 705/39 |
| 8,538,872 B1 * | 9/2013 | Voutour et al. | 705/39 |
| 8,611,919 B2 * | 12/2013 | Barnes, Jr. | 455/456.1 |
| 2002/0007332 A1 * | 1/2002 | Johnson et al. | 705/36 |
| 2002/0016745 A1 * | 2/2002 | Kuwahara et al. | 705/26 |
| 2002/0038278 A1 * | 3/2002 | Himmelstein | 705/37 |
| 2002/0062269 A1 * | 5/2002 | Kirmani et al. | 705/35 |
| 2002/0082961 A1 * | 6/2002 | Abrahm et al. | 705/35 |
| 2003/0055735 A1 * | 3/2003 | Cameron et al. | 705/26 |
| 2003/0078895 A1 * | 4/2003 | MacKay | 705/64 |
| 2003/0101136 A1 * | 5/2003 | Wheeler et al. | 705/42 |
| 2003/0195828 A1 * | 10/2003 | Honarvar et al. | 705/35 |
| 2004/0122685 A1 * | 6/2004 | Bunce | 705/1 |
| 2004/0122747 A1 * | 6/2004 | Jimenez et al. | 705/27 |
| 2004/0148211 A1 * | 7/2004 | Honarvar et al. | 705/7 |
| 2004/0215572 A1 * | 10/2004 | Uehara et al. | 705/64 |
| 2005/0038715 A1 * | 2/2005 | Sines et al. | 705/26 |
| 2005/0097039 A1 * | 5/2005 | Kulcsar et al. | 705/40 |
| 2005/0165696 A1 * | 7/2005 | Jakobsson et al. | 705/65 |
| 2005/0182714 A1 * | 8/2005 | Nel | 705/39 |
| 2005/0216728 A1 * | 9/2005 | Relan et al. | 713/153 |
| 2005/0238149 A1 * | 10/2005 | De Leon | 379/93.12 |
| 2006/0047588 A1 * | 3/2006 | Lal et al. | 705/30 |
| 2006/0080232 A1 * | 4/2006 | Epps | 705/39 |
| 2006/0089903 A1 * | 4/2006 | Ford et al. | 705/38 |
| 2006/0218053 A1 * | 9/2006 | Jimenez et al. | 705/26 |
| 2006/0229977 A1 * | 10/2006 | Schleicher | 705/39 |
| 2006/0259390 A1 * | 11/2006 | Rosenberger | 705/35 |
| 2007/0005496 A1 * | 1/2007 | Cataline et al. | 705/40 |
| 2007/0050284 A1 * | 3/2007 | Freeman | 705/38 |
| 2007/0138265 A1 * | 6/2007 | Powell et al. | 235/381 |
| 2007/0162382 A1 * | 7/2007 | Lesniak | 705/39 |
| 2007/0168295 A1 * | 7/2007 | Wu | 705/64 |
| 2008/0015973 A1 * | 1/2008 | Erisman | 705/37 |
| 2008/0071667 A1 * | 3/2008 | Himmelstein | 705/37 |
| 2008/0270295 A1 * | 10/2008 | Lent et al. | 705/38 |
| 2009/0098854 A1 * | 4/2009 | Park et al. | 455/407 |
| 2009/0099947 A1 * | 4/2009 | Boehm et al. | 705/35 |
| 2009/0119181 A1 * | 5/2009 | Pratt et al. | 705/17 |
| 2009/0234885 A1 * | 9/2009 | Yotsukura | 707/104.1 |
| 2010/0017325 A1 * | 1/2010 | Scherpa et al. | 705/39 |
| 2010/0063914 A1 * | 3/2010 | Lozano et al. | 705/35 |
| 2010/0114768 A1 * | 5/2010 | Duke et al. | 705/41 |
| 2010/0312675 A1 * | 12/2010 | Awad et al. | 705/30 |
| 2011/0066822 A1 * | 3/2011 | Ikeda | 711/170 |
| 2011/0145122 A1 * | 6/2011 | Haggerty et al. | 705/35 |
| 2011/0287808 A1 * | 11/2011 | Huang | 455/557 |
| 2012/0004963 A1 * | 1/2012 | Constantine | 705/14.14 |
| 2012/0116959 A1 * | 5/2012 | Pitroda et al. | 705/39 |
| 2012/0136732 A1 * | 5/2012 | McMillen et al. | 705/16 |
| 2012/0203632 A1 * | 8/2012 | Blum et al. | 705/14.53 |
| 2012/0290465 A1 * | 11/2012 | Kline et al. | 705/37 |
| 2013/0054470 A1 * | 2/2013 | Campos et al. | 705/67 |
| 2013/0060618 A1 * | 3/2013 | Barton et al. | 705/14.23 |
| 2013/0159166 A1 * | 6/2013 | Irick | 705/38 |
| 2013/0252581 A1 * | 9/2013 | O'Neil et al. | 455/408 |
| 2013/0275309 A1 * | 10/2013 | Kwong | 705/71 |

OTHER PUBLICATIONS

Mondex, www.mastercardworldwide.com: 1994-2007.*
Mondex, http:\\www.mondex.com, © 1994-2007 MasterCard.

* cited by examiner

POINT OF SALE TRANSACTION PROCESSING

BACKGROUND

1. Field of the Disclosure

The present disclosure relates the use of mobile communication devices in purchasing transactions.

2. Description of the Related Art

Consumers in the U.S. have nine credit cards on average. Managing and maintaining appropriate balances on those cards and using the optimal credit source to make purchases can be difficult when customers must generally rely on their memories concerning, as examples, available credit, and payment due dates.

DESCRIPTION OF THE EMBODIMENT(S)

In one aspect, a disclosed transaction processing method includes transmitting a request to a credit aggregator in response to a message from a point of sale device to a wireless communication device (WCD) of a user. Responsive to receiving credit account information from the credit aggregator, a user interface indicative of at least some of the credit account information including account identification information for a plurality of user credit accounts is displayed. Responsive to detecting a user selecting one of the plurality of credit accounts, credit account information is transmitted to the point of sale device. The request may include information identifying the user. The message from the point of sale device may indicate a price associated with the transaction. The credit account information may include available credit information, current balance information, closing date information, payment date information, annual percentage rate information, and so forth.

In another aspect, a disclosed transaction processing method includes, responsive to receiving a request from a WCD of a user, the request containing information indicative of the user's identity, retrieving credit account information associated with said user and transmitting at least some of the credit account information to the WCD. The credit account information may include information pertaining to a plurality of credit accounts associated with said user. Retrieving the credit account information may include contacting a credit source associated with a particular credit account to obtain real time credit account information for the particular credit account including real time available credit information and/or real time current balance information. Receiving the request may include receiving the request via a cellular transmission protocol associated with the WCD. The credit account information may include credit balance information, credit available information, payment date information, statement closing date information, and interest rate information.

In another aspect, a disclosed WCD suitable for use within a transaction processing system includes a processor, storage accessible to the processor, and a wireless module enabling wireless communication. The storage includes a set of processor executable instructions including instructions to: respond to receiving a message from a point of sale device by transmitting to a remote object a request for information pertaining to a plurality of sources of the subscriber's credit, respond to receiving the requested information from the remote object by displaying at least some of the credit account information on a display of the WCD, and respond to the selection of at least one of the sources of credit by the consumer by transmitting an indication of the selection to the point of sale device.

In still another aspect, a disclosed WCD is suitable for use in an electronic purchasing application environment. The device includes a processor and a storage resource accessible to the processor, a radio frequency (RF) module for communicating via a wireless cellular technology, and an application module, at least partially stored in said storage, including instructions executable by the processor. The application module includes instructions to: receive from a wireless point of sale device information indicative of a purchase; transmit information indicative of a purchase price to a credit aggregation resource, the credit aggregation resource being in communication with a source of the consumer's credit; receive from the aggregation resource a list of multiple available credit sources; present the list to the consumer and detect a credit source selection from the consumer; and transmit the credit source selection to the point of sale device for completing the transaction.

Figure 1:
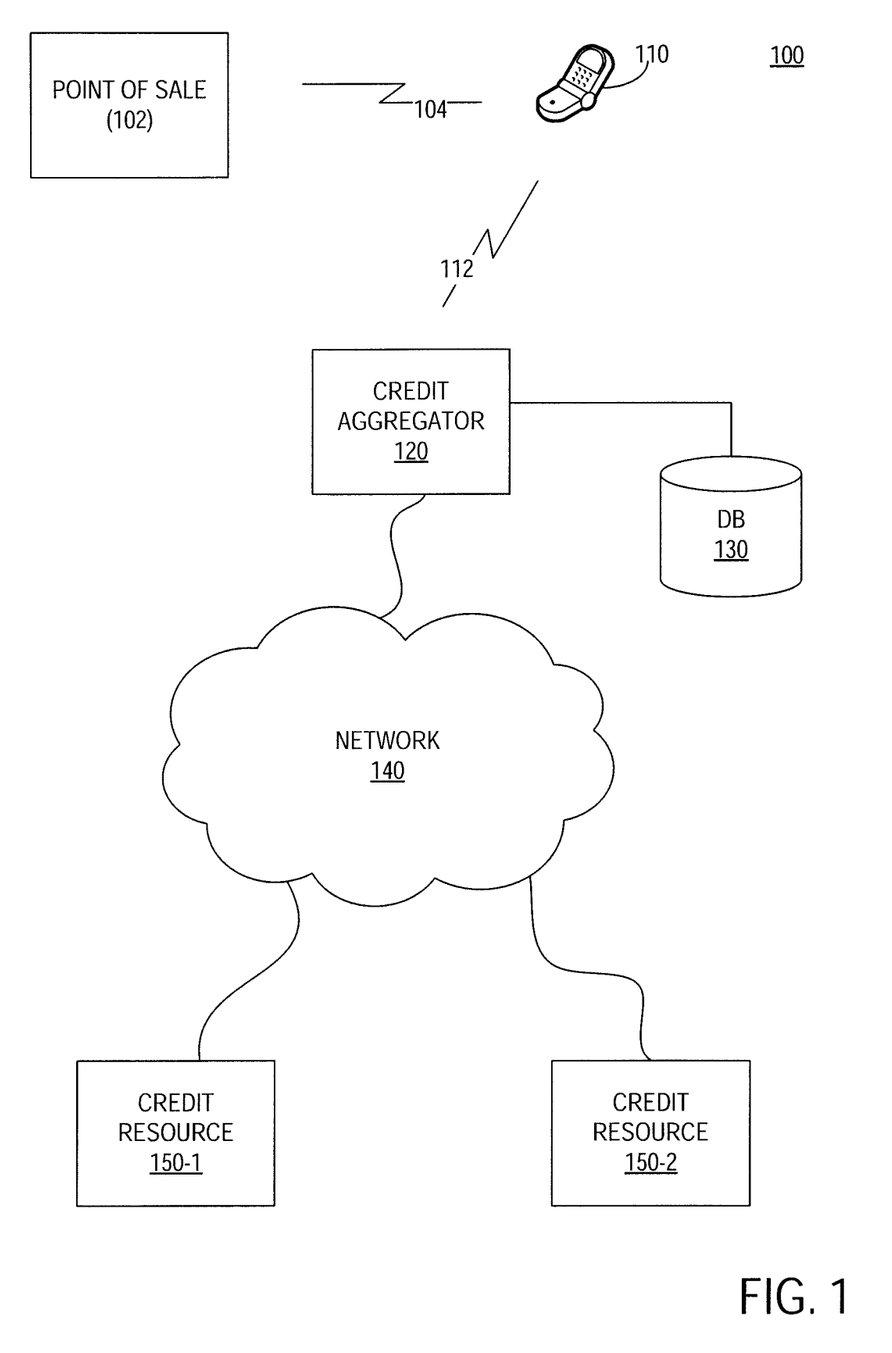
FIG. 1 is block diagram of selected elements of an embodiment of a purchasing transaction system.

Referring now to the drawings, FIG. 1 depicts selected elements of a transaction facilitation system (TFS) 100. In the depicted embodiment, TFS 100 includes a point of sale (POS) device 102, a WCD 110 and a credit aggregator (CA) 120. CA 120 as shown has access to a profile database 130. CA 120 is connected to one or more credit sources 150-1 through 150-n via network 140. In some embodiments, TFS 100 facilitates transactions by providing a user of WCD 110 with credit information that beneficially enables the user to select the most appropriate source of credit for a given transaction. Although TFS 100 is described herein with respect to consumer, point-of-sale transactions, one skilled in the field will recognize the applicability of the described system for use in non-consumer applications and environments. TFS 100 may be employed in, as examples, commercial, industrial, governmental, and educational environments. In some embodiments, TFS 100 facilitates transactions by providing the user of WCD 110 with real time information from one or more credit accounts. The user may then select the most appropriate credit account or source of credit for the applicable transaction. The information provided to the user of WCD 110 may include information such as the real time current balance, real time available credit, payment due date, monthly closing date, applicable interest rate associated with the transaction, and any promotional or reward bonus associated with the particular transaction. As used in this disclosure, the term "real time" encompasses all credit account activity that the credit source of which the credit source is aware. Thus, real time current balance information may include the current balance that would be indicated by the applicable credit source if the user were to submit an online or telephonic balance inquiry.

In the depicted embodiment of TFS 100, POS device 102 communicates one or more messages 104 to WCD 110. In the depicted embodiment, messages 104 are wirelessly transmitted by POS 102 and received by WCD 110. The wireless messages 104 may, in some embodiments, be formatted to comply with a wireless transmission protocol that utilizes an "open" portion of the RF spectrum. Suitable transmission protocols would include an IEEE 802.11 family protocol (WiFi) or an IEEE 802.15 family protocol, also referred to as a personal area network (PAN) protocol. Pervasive examples of PANs include Bluetooth and Zigbee networks.

In some embodiments, the message(s) 104 transmitted to WCD 110 may include information about items that are being purchased by the user of WCD 110. The information could include, for example, product identifying information either in the form of a text-based identification or a numeric or alphanumeric product code associated with each item. The messages 104 of this type may include additional information such as the price per item, any sales discounts, and so forth.

When all items being purchased by the user have been scanned or otherwise input to POS device 102, the user or check out personnel may enter a subtotal button or other similar indicator.

WCD 110 as described herein is operable to receive messages wirelessly transmitted from POS device 102 and to initiate a credit selection process in response. In the embodiment depicted in FIG. 1, for example, WCD 110 is shown in wireless communication with a CA 120. The communication between WCD 110 and CA 120 may be an "open" wireless communication such as a Bluetooth or WiFi communication, but the inherent limitations of these short range protocols is undesirable. In other embodiments, communication between WCD 110 and CA 120 is transmitted via a cellular transmission protocol that WCD 110 supports. For example, the communication 112 between WCD 110 and CA 120 may comply with a second generation (2G) or third generation (3G) cellular transmission protocol.

In some embodiments, WCD 110 receives a message, referred to herein as a subtotal message, from POS device 102 indicating that all items being purchased have been scanned or otherwise recognized by the POS device 102. The subtotal message may include a range of information including, as examples, the subtotal dollar amount, and an indication of the quantity and identity of items being purchased.

When the subtotal message is received by WCD 110, one embodiment of WCD 110 communicates a credit inquiry to CA 120. The credit inquiry includes an indication of the consumer's identity and may include all, some, or very little of the subtotal information received from POS device 102. CA 120 as shown accesses a profile database 130 or another storage resource to determine the sources of credit available to the user. CA 120, after receiving the relevant credit source information pertaining to the user, may communicate with one or more of the credit sources indicated in the user's profile to obtain real time credit status information including, as examples, current balance, available credit, and so forth.

When CA 120 has retrieved or received all of the credit source information, CA 120 forwards the credit information to WCD 110. WCD 110 includes computer software modules to present the credit information in a graphical user interface (GUI) in which is depicted the available sources of credit and real time information pertaining to one or more of the indicated accounts.

WCD 110 then presents the credit account GUI to the user and monitors for a keyboard or other form of input indicating the user's selection of one of the credit accounts. When the user selects one of the credit accounts displayed in the GUI, WCD 110 transmits a message 104 to POS device 102 indicating the selected credit source. POS device 102 may then initiate a credit processing transaction with the selected credit source. In this manner, users are able to make best use of their credit without having to remember long account numbers or how much activity has been charged or otherwise allocated to specific accounts.

Thus, the described TFS 100 is operable to permit a consumer or other user of WCD 110 to choose from among a potentially large number of credit sources based on real time account status data provided to the user.

Figure 2:
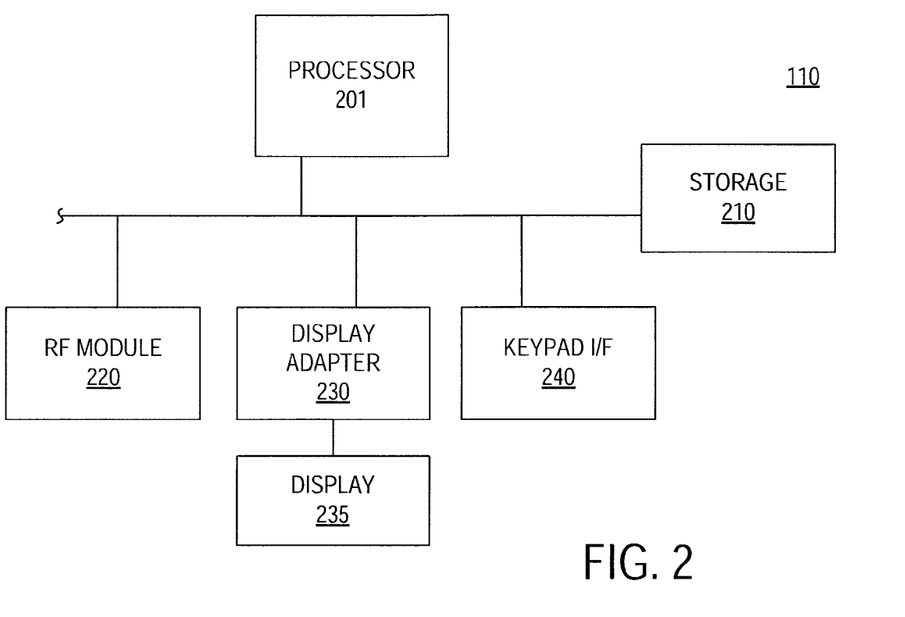
FIG. 2 is a block diagram of selected elements of an embodiment of a wireless communication device suitable for use in the system of FIG. 1.

Turning now to FIG. 2, a simplified block diagram illustrates selected elements of an embodiment of WCD 110. WCD 110 is exemplified by any of various cellular telephones or personal data assistants (PDAs). In at least some embodiments, WCD 110 includes telephony functionality including a module to transmit and receive an RF signal.

In the embodiment depicted in FIG. 2, WCD 110 includes a processor 201 having access to a storage resource 210. Processor 201 may be implemented with a microprocessor, an embedded processor, or the like. Storage resource 210 may include volatile storage including, as examples, dynamic random access memory (DRAM) and static dynamic random access memory (SRAM), read only memory (ROM), flash memory, magnetic and optical disk-based storage mediums and other forms of persistent or non-volatile memory.

WCD 110 as shown in FIG. 2 further includes a keypad interface 240 operable to communicate key strokes to processor 201. Keystrokes may be entered using hard or physical keys as well as soft keys presented via a GUI. A display device adapter 230 provides an interface between display 235 and processor 201. An RF module 220 supports or otherwise facilitates wireless communication to and from WCD 110. In some embodiments, portions or features of WCD 110 may be implemented as computer executable instructions stored in storage resource 210 or another storage element accessible to processor 201.

Figure 4:
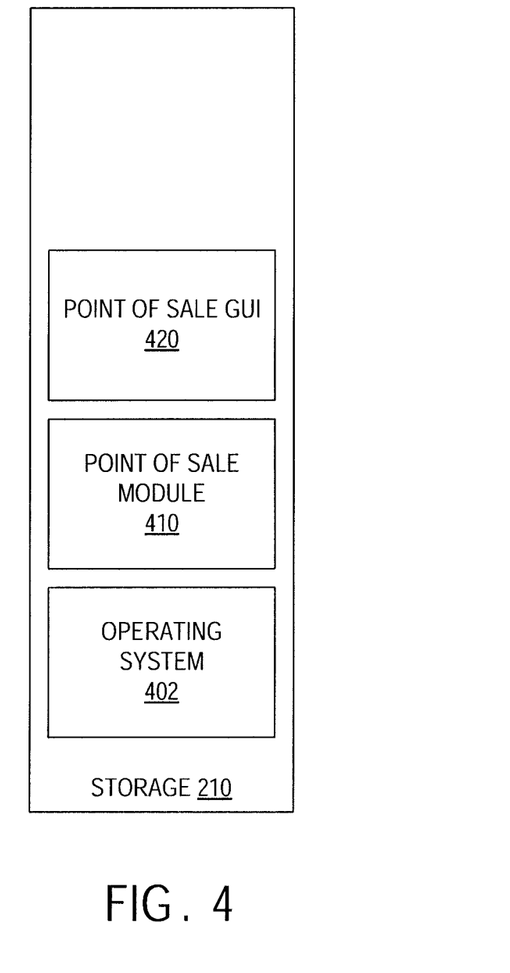
FIG. 4 is a block diagram of selected software modules employed in one embodiment of the wireless communication device of FIG. 2.

Referring to FIG. 4, for example, a block diagram of selected software modules embedded or otherwise stored in storage resource 210 of one embodiment of WCD 110 is presented. In the depicted embodiment, an operating system 402 supports a POS module 410 and a POS GUI 420. Operating system 402 may include elements of a commercially distributed PDA operating system including, as examples, a Windows® Mobile operating system, an Open Embedded operating system, or the like. POS module 410 and POS GUI 420 cooperate, as described in greater detail below, to initiate retrieval of credit account information from a remote source and present at least some of the retrieved information to the user via display 235 of WCD 110. POS module 410 responds to messages from a POS terminal such as POS device 102 by transmitting an inquiry for credit account information to a remote destination. In some embodiments, the inquiry is transmitted to a server or other destination operable to return credit account information from a plurality of credit sources. The CA 120 depicted in FIG. 1 is an example of a server or other type of accessible resource capable of providing credit account information to WCD 110. In other embodiments, WCD 110 may transmit credit account inquiries directly to one or more credit sources such as the credit sources 150 depicted in FIG. 1. The use of a single resource such as CA 120 beneficially enables the application to retrieve all or most of the desired credit account information in response to a single inquiry from WCD 110. On the other hand, direct requests from WCD 110 to one or more credit sources 150 may be desirable or necessary for credit sources that may not release credit account information to CA 120. POS GUI 420 may parse and format at least some of the retrieved credit account information for presentation to the user via display 235.

Figure 3:
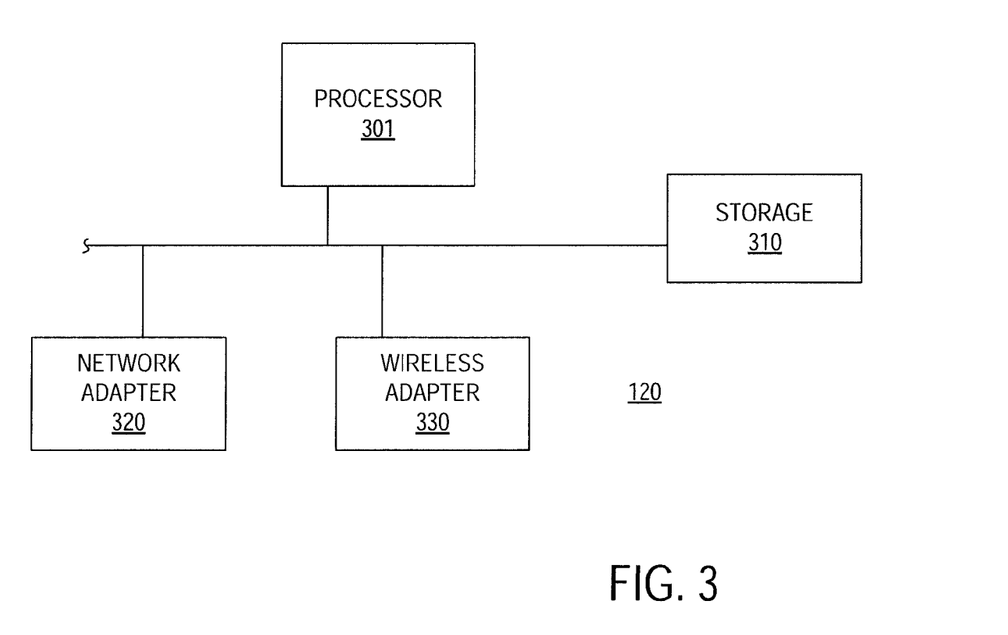
FIG. 3 is a block diagram of selected elements of an embodiment of a credit aggregation resource suitable for use in the system of FIG. 1.

Referring to FIG. 3, selected elements of one embodiment of CA 120 are illustrated. In some embodiments, CA 120 represents or resides on a server that is accessible to WCD 110. As depicted in FIG. 3, a storage resource 310, a network adapter 320, and a wireless adapter 330 are accessible to a processor 301. Processor 301 may be implemented with a commercially distributed, server class microprocessor device such as a Xeon® processor from Intel or an Opteron® processor from Advanced Micro Devices. Storage resource 310 represents or includes volatile memory resources including DRAM, SRAM, and the like, as well as persistent storage elements including magnetic or optical hard disks, flash memory or other types of semiconductor storage, and so forth. Network adapter 320 provides an interface that enables communication between processor 301 and network 140. Network 140 may be a private network, a public network, or a combination thereof. Network 140 may be implemented as an Internet Protocol (IP) based network or in compliance with another network protocol. At least some portions of CA 120 may be implemented as computer software modules that include a set or sequence of computer executable instructions stored on storage resource 310 or another suitable storage device.

Figure 5:
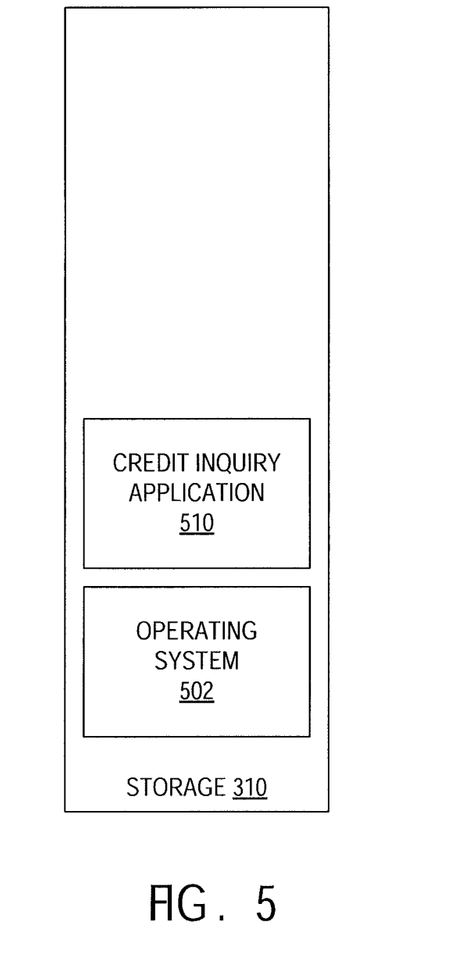
FIG. 5 is a block diagram of selected software modules employed in one embodiment of the credit aggregation resource of FIG. 3.

Referring to FIG. 5, the depicted embodiment of storage resource 310 is shown as including an operating system 502 and a credit inquiry application 510. Operating system 502 may include elements of commercially distributed operating systems including a Windows® family operating system from Microsoft, a Linux® family operating system, a Unix family operating system, and or the like. Credit inquiry application 510, as described in greater detail below, responds to credit account inquiries from WCDs 110 by identifying sources of credit associated with the WCD user and providing real time information regarding the status of one or more of the identified credit sources.

Figure 6:
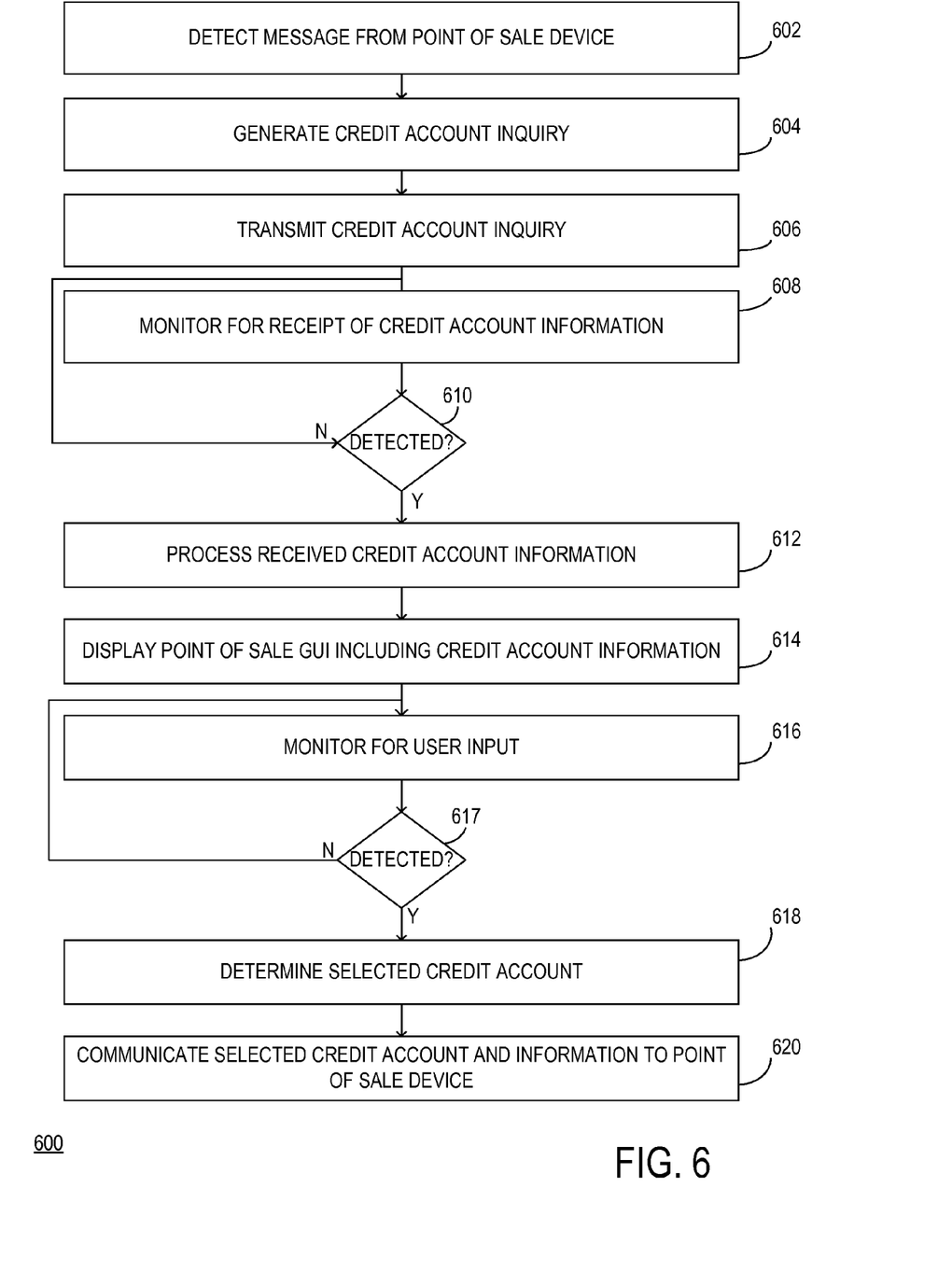
FIG. 6 is a flow diagram of selected elements of an embodiment of a method performed by the wireless communication device of FIG. 2.

Referring now to FIG. 6, a flow diagram illustrates selected elements of one embodiment of a method 600 of determining a credit source for payment of a sales transaction. Method 600 as shown may be implemented as computer software executed by WCD 110 in response to receiving a subtotal message or other form of message from a POS device 102. In the depicted embodiment, method 600 includes detecting (block 602) a subtotal message from a POS device such as POS device 102. The subtotal message referred to represents a message from the POS device indicating that all items for purchase have been scanned or otherwise accounted for and that a total dollar amount applicable to the transaction has been determined. The subtotal message may be initiated when a check out person or the user enters a subtotal button on a cash register or similar device. The subtotal message may vary in the amount of information it provides to WCD 110. In some embodiments the subtotal message may include little more than the total dollar amount of the transaction. In other embodiments, the subtotal message may include additional information such as an inventory of the items purchased.

WCD 110 responds to receiving the subtotal message by generating (block 604) a credit inquiry and transmitting (block 606) the inquiry to a remote resource such as the CA 120 or directly to a credit source 150. The transmitted credit inquiry includes information indicative of the identity of the user as well as information pertaining to the pending transaction. The user's identity information may include any type of information by which CA 120 or credit source 150 can identify the user. This may include an account number assigned to the user, the user's social security number or employee identification number, or the like. The information pertaining to the transaction includes a dollar, or other currency, amount associated with the transaction. The transaction information may further include, depending upon the implementation, additional information regarding the transaction including, as examples, an inventory of the items associated with the transaction, the merchant or store where the transaction is pending, and so forth. In one embodiment, the CA 120 is a resource component of a cellular network to which WCD 110 is a subscribing unit. In one such embodiment, for example, CA 120 is hosted on an application server that is networked or otherwise accessible to a mobile switching center (not depicted) that communicates with a cellular base station (not depicted) via which WCD 110 transceives telephony based communications including phone calls.

After transmitting the credit inquiry, method 600 includes monitoring (block 608) for incoming credit account information from CA 120, a credit source 150, or another resource that processes the credit inquiry. In some embodiments, block 608 incorporates a timeout feature that terminates the monitoring after a specified duration has expired without receiving a response to the credit inquiry. When (block 610) CA 120 or another object returns credit account information in response to the credit inquiry, method 600 includes processing (block 612) the received credit account information and presenting (block 614) the processed information to the user via POS GUI 420 or another suitable interface. In some embodiments, the processing of credit account information may include decrypting the information and parsing relevant portions of the information for use in presenting to the user. The displaying of the processed information may include invoking POS GUI 420 to present the credit information in a user friendly and user informative format.

Figure 7:
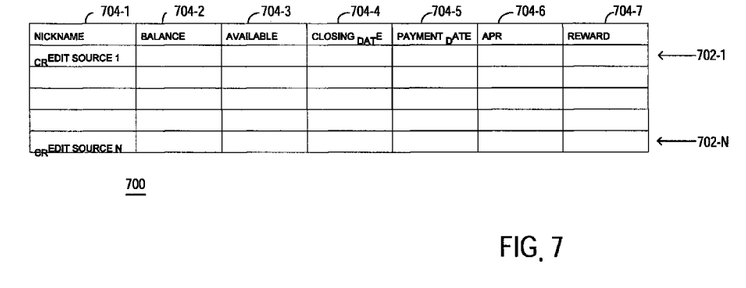
FIG. 7 illustrates an embodiment of a graphical user interface generated by the wireless communication device of FIG. 2.

Referring to FIG. 7, an exemplary embodiment of a GUI 700 generated by POS GUI 420 is depicted to illustrate the presentation of credit account information to the user. In the depicted example, GUI 700 is implemented as a table 700 having a set of rows 702 and columns 704. Each row 704 as shown in FIG. 7 corresponds to a credit source 150. Credit sources 150 may correspond to credit card providers, banks, and the like. Each row may include a column 704-1 containing a descriptive nickname for the account, a balance column 704-2 displaying a current balance amount for the applicable account, an available balance column 704-3 indicating the amount of credit currently available through the applicable account, a closing date column 704-4 indicating a closing date for the current billing cycle of the corresponding account, a due date column 704-5 indicating a due date for any invoices received, an indication of an annual percentage rate (APR) or other applicable interest rate in column 704-6 and an indication of whether any special rewards are associated with the transaction in column 704-7. Those skilled in the field will recognize that the selection of what specific credit account information to present to a user is an implementation specific decision and other embodiments may include fewer, more, and/or different columns than the columns shown in FIG. 7.

Returning to FIG. 6, method 600 further includes, after presenting the GUI 700 to the user, monitoring (block 616) for user input. In some embodiments, the user input is in the form of selecting from a credit account from the credit account/displayed in GUI 700. In some embodiments, the rows of GUI 700 are selectable via a point and click interface, keypad interface, or other suitable I/O interface (not depicted). For example, the WCD 110 may include a resource to point and click on at least one and possibly any of the rows 702 included in GUI 700. In this embodiment, the user of WCD 110 may use a track ball, arrow keys, or other suitable input device to select a particular row. When the user presses and enters a button or takes other action indicating the selection, the GUI 700 determines (block 618) which credit source is associated with the selected row. The credit source may be identified by any appropriate mechanism including, for example, a creditor number assigned to each creditor. The identification of the selected creditor may include information sufficient to initiate a transaction processing sequence with the creditor. In some instances, for example, the selection source of credit may be identified by a telephone number. Regardless of the specific manner in which a selected source of credit is identified, method 600 as shown in FIG. 6 includes communicating (block 620) information indicating the selected credit source to POS device 102 so that POS device 102 can initiate a transaction completion sequence and method 600 can terminate.

Figure 8:
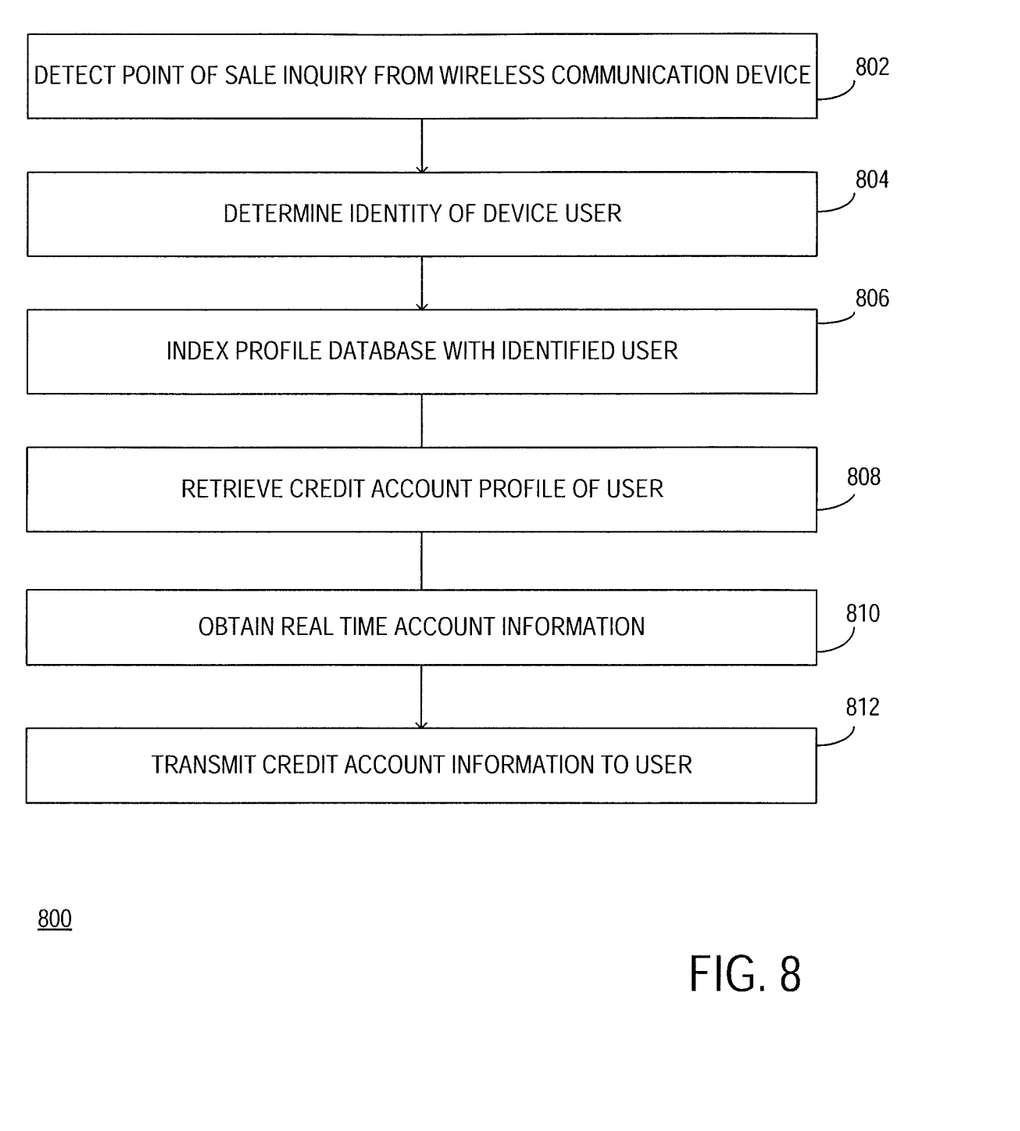
FIG. 8 is a flow diagram of selected elements of an embodiment of a method performed by the credit aggregation resource of FIG. 3.

Referring now to FIG. 8, selected elements of one embodiment of a method 800 performed by CA 120 as shown in FIG. 1 are depicted. In the depicted embodiment, method 800 may represent steps taken by CA 120 in response to receiving a credit inquiry from WCD 110. In the depicted embodiment, method 800 includes detecting (block 802) a POS inquiry transmitted by a user WCD device such as WCD 110. Method 800 as shown includes determining (block 804) an identity of the consumer or other user associated with the credit inquiry. The consumer identity information may be parsed from the credit inquiry according to a predefined technique. As shown in FIG. 8, method 800 then includes indexing (block 806) a profile database 130 using the user's identity information and retrieving (block 808) credit account information associated with the indexed user.

In some embodiments, the credit account information residing in profile database 130 may be updated from time to time by CA 120. For example, CA 120 may update the information every 24 hours at a time when network bandwidth consumption is low. Thus, the credit account information, e.g., the current and available balance information, residing in profile database 130 may be sufficiently recent to render unnecessary a step of obtaining real time updates to the stored information. In other embodiments, however, method 800 may include an optional step of contacting one or more creditors associated with any credit account listed in a user's profile to obtain live, real-time credit account information associated with that account. In some embodiments, desirable for their accurate and up to date credit account information, method 800 includes step 810 to obtain or update real-time account information associated with a user. The obtaining of real time information may include credit inquiry application 150 engaging in a real time communication with one or more of the credit accounts associated with the user. In some embodiments, for example, CA 120 transmits a telephonic or network based inquiry to some or all of the credit accounts associated with a user's credit profile. In these embodiments, the credit account information is the most accurate credit information available. As depicted in FIG. 8, method 800 then includes transmitting (block 812) the credit account information to WCD 110 for processing, displaying, and selecting a credit provider as described above.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A transaction processing method, comprising:
   receiving, by a wireless communication device associated with a user, a subtotal message, generated by a point of sale device, wherein the subtotal message indicates that a total dollar amount of multiple items included in a purchasing transaction has been recognized by the point of sale device;
   responsive to receiving the subtotal message, transmitting a request for credit account information to a credit aggregator;
   responsive to receiving the credit account information from the credit aggregator, displaying a user interface indicative of at least some of the credit account information including account identification information for a plurality of user credit accounts; and
   responsive to detecting a user selecting a first credit account from the plurality of user credit accounts, transmitting automatically, by the processor of the wireless communication device, account identification information for the first credit account directly to the point of sale device for completion of the purchasing transaction at the time of purchase;
   wherein the credit account information includes closing date information, indicative of an ending date of a current billing period, for the plurality of user credit accounts.

2. The method of claim 1, wherein the credit account information includes interest rate information for the plurality of user credit accounts.

3. The method of claim 1, wherein the credit account information includes payment date information for the plurality of user credit accounts.

4. The method of claim 1, wherein the credit account information includes interest rate information for the plurality of user credit accounts.

5. The method of claim 1, wherein the credit account information includes current balance information for the plurality of user credit accounts.

6. A transaction processing method, comprising:
   responsive to receiving a request from a wireless communication device of a user at a time of a purchase associated with a point of sale device, the request, sent in response to a subtotal message indicating a total dollar amount for multiple items, containing information indicative of the user's identity, retrieving credit account information for a plurality of user credit accounts associated with the user, the credit account information including payment due date information for the plurality of user credit accounts, closing date information, indicative of an ending date of a current billing period, and interest rate information for the plurality of user credit accounts; and
   transmitting at least some of the credit account information to the wireless communication device at the time of purchase.

7. The method of claim 6, wherein the credit account information includes information indicating reward information for the plurality of user credit accounts.

8. The method of claim 6, wherein retrieving the credit account information comprises contacting a credit source associated with a particular credit account to obtain real time credit account information for the particular credit account.

9. The method of claim 6, wherein receiving the request comprises receiving the request via a cellular transmission protocol associated with the wireless communication device.

10. The method of claim 6, wherein the credit account information includes credit balance information, credit available information, and closing date information from each of the plurality of user credit accounts.

11. A wireless communication device suitable for use within a transaction processing system, comprising:
a processor;
computer readable storage accessible to the processor; and
a wireless module enabling wireless communication;
wherein the storage includes processor executable program instructions that, when executed by the processor, cause the processor to perform operations including:
responsive to receiving, from a point of sale device at a time of purchase, a subtotal message, wherein the subtotal message that indicates a total dollar amount of multiple items included in a purchasing transaction has been recognized by the point of sale device, wirelessly transmitting a request for credit account information to each of a plurality of credit sources available to the user;
responsive to receiving the credit account information from the credit sources, displaying a user interface indicative of at least some of the credit account information including account identification information for a plurality of user credit accounts; and
responsive to the user selecting, from the user interface, a first user credit account, transmitting credit account information associated with the first user credit account directly to the point of sale device;
wherein the credit account information includes closing date information, indicative of an ending date of a current billing period, for the plurality of user credit accounts.

12. The wireless communication device of claim 11, wherein transmitting the requests for credit account information comprises transmitting the requests in compliance with a cellular transmission protocol.

13. The wireless communication device of claim 11, wherein the credit account information includes available credit information.

14. The wireless communication device of claim 11, wherein the credit account information includes payment due date information.

15. The wireless communication device of claim 11, wherein displaying the user interface includes a table wherein each row in the table corresponds to one of the plurality of user credit accounts and wherein the table includes a column corresponding to each of a group of parameters wherein the group of parameters includes: current balance, available credit, closing date, payment due date, and interest rate.

16. The wireless communication device of claim 15, wherein the group of parameters includes a credit reward parameter and the table includes a credit reward column.

17. A credit aggregator, comprising:
a processor; and
a computer readable storage medium, accessible to the processor, including processor—executable program instructions that, when executed by the processor, cause the processor to perform operations comprising:
responding to receiving, from a wireless communication device associated with a user, a request for credit information wherein the request, sent in response to a subtotal message indicating a total dollar amount for multiple items, includes information indicative of a subtotal for a plurality of items included in a purchasing transaction at a time of purchase by obtaining real time available credit information associated with each of a set of credit accounts associated with the user; and
transmitting the available credit information to the user to facilitate payment for the transaction at the time of purchase, wherein the available credit information includes payment due date information, closing date information, indicative of an ending date of a current billing period, and interest rate information for each of the credit accounts.

18. The credit aggregator of claim 17, wherein the credit aggregator is hosted on a mobile communication switch operably connected to the wireless communication device via a cellular base station and wherein the credit aggregator is connected via a computer network to a credit source associated with at least one of the credit accounts.

19. The wireless communication device of claim 18, wherein the credit account information includes real time information indicative of: a current balance, available credit, closing date, payment due date, and interest rate associated with each of the plurality of user credit accounts.

20. A wireless communication device suitable for use within a transaction processing system, comprising:
a processor;
computer readable storage accessible to the processor; and
a wireless module enabling wireless communication;
wherein the storage includes processor executable program instructions, that, when executed by the processor, cause the processor to perform operations including:
responsive to receiving, from a point of sale device at a time of purchase, a subtotal message indicating a dollar amount of multiple items included in a purchasing transaction, wirelessly transmitting, to a credit aggregator, a message including the dollar amount and requesting credit account information;
responsive to receiving, from the credit aggregator, the credit account information for a plurality of user credit accounts, displaying a user interface indicative of at least some of the credit account information including account identification information for a plurality of user credit accounts; and
responsive to detecting user selection, from the user interface, of a first user credit account, transmitting credit account information associated with the first user credit account directly to the point of sale device;
wherein the credit account information includes closing date information, indicative of an ending date of a current billing period, for the plurality of user credit accounts.

* * * * *